United States Patent
Gaide

(10) Patent No.: US 10,198,336 B2
(45) Date of Patent: Feb. 5, 2019

(54) MODULE STATUSES CORRESPONDING TO SLOT LOCATIONS

(71) Applicant: Hewlett Packard Enterprise Development LP, Houston, TX (US)

(72) Inventor: Benjamin Thomas Gaide, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 112 days.

(21) Appl. No.: 15/337,678

(22) Filed: Oct. 28, 2016

(65) Prior Publication Data

US 2018/0120351 A1 May 3, 2018

(51) Int. Cl.
  *G06F 11/30* (2006.01)
(52) U.S. Cl.
  CPC ................. *G06F 11/3051* (2013.01)
(58) Field of Classification Search
  CPC .......... G01R 33/20; G01V 3/32; G01N 24/00; A61B 5/055
  See application file for complete search history.

(56) References Cited

U.S. PATENT DOCUMENTS

| | | | |
|---|---|---|---|
| 5,953,243 A | 9/1999 | Capps, Jr. et al. | |
| 6,617,972 B2* | 9/2003 | Takarada | G08B 21/0484 |
| | | | 324/538 |
| 6,941,400 B2 | 9/2005 | Hungerbuehler et al. | |
| 8,779,729 B2* | 7/2014 | Shiraishi | G01R 31/3606 |
| | | | 320/155 |
| 2005/0253828 A1 | 11/2005 | Jeong | |
| 2010/0035461 A1 | 2/2010 | Berke | |
| 2012/0098518 A1* | 4/2012 | Unagami | G01R 22/066 |
| | | | 324/74 |

OTHER PUBLICATIONS ifixit.com, "Installing Computer Memory," (Web Page), 2005, 3 pages, available at https://www.ifixit.com/Wiki/Installing_Computer_Memory.
Mueller, S., "Upgrading and Repairing Pcs: Memory," (Web Page), Jan. 6, 2010, 7 pages, available at http://www quepublishing com/articles/article aspxp=1416688&segNum=4.

* cited by examiner

*Primary Examiner* — Giovanni Astacio-Oquendo
(74) *Attorney, Agent, or Firm* — Hewlett Packard Enterprise Patent Department

(57) ABSTRACT

An example device in accordance with an aspect of the present disclosure includes a plurality of pins coupled to a controller to receive a plurality of module statuses corresponding to slot locations of the enclosure at various proximity tiers relative to the module. The controller is to check a first pin of the plurality of pins to identify whether a first proximity tier relative to the module is occupied, regardless of a slot location of the module in the enclosure.

17 Claims, 6 Drawing Sheets

| Binary Pin | Prox. Hierarchy Tier | Assgnmt | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|---|---|
| 0 | 0 - Self | XXXX | 0 | 1 | 2 | 3 | 4 | 5 | 6 | 7 | 8 | 9 | 10 | 11 | 12 | 13 | 14 | 15 |
| 1 | 1 - Pair - Partner | XXXN | 1 | 0 | 3 | 2 | 5 | 4 | 7 | 6 | 9 | 8 | 11 | 10 | 13 | 12 | 15 | 14 |
| 10 | 2 - Quad - Even Partner | XXN0 | 2 | 3 | 0 | 1 | 6 | 7 | 4 | 5 | 10 | 8 | 8 | 8 | 14 | 14 | 12 | 12 |
| 11 | 2 - Quad - Odd Partner | XXN1 | 3 | 3 | 1 | 1 | 7 | 7 | 5 | 5 | 11 | 10 | 9 | 9 | 15 | 15 | 13 | 13 |
| 100 | 3 - Octa Lowest | XN00 | 4 | 4 | 4 | 4 | 0 | 0 | 0 | 0 | 12 | 12 | 12 | 12 | 8 | 8 | 8 | 8 |
| 101 | 3 - Octa 2 | XN01 | 5 | 5 | 5 | 5 | 1 | 1 | 1 | 1 | 13 | 13 | 13 | 13 | 9 | 9 | 9 | 9 |
| 110 | 3 - Octa 3 | XN10 | 6 | 6 | 6 | 6 | 2 | 2 | 2 | 2 | 14 | 14 | 14 | 14 | 10 | 10 | 10 | 10 |
| 111 | 3 - Octa Highest | XN11 | 7 | 7 | 7 | 7 | 3 | 3 | 3 | 3 | 15 | 15 | 15 | 15 | 11 | 11 | 11 | 11 |
| 1000 | 4 - Sexdec Lowest | N000 | 8 | 8 | 8 | 8 | 8 | 8 | 8 | 8 | 0 | 0 | 0 | 0 | 0 | 0 | 0 | 0 |
| 1001 | 4 - Sexdec 2 | N001 | 9 | 9 | 9 | 9 | 9 | 9 | 9 | 9 | 1 | 1 | 1 | 1 | 1 | 1 | 1 | 1 |
| 1010 | 4 - Sexdec 3 | N010 | 10 | 10 | 10 | 10 | 10 | 10 | 10 | 10 | 2 | 2 | 2 | 2 | 2 | 2 | 2 | 2 |
| 1011 | 4 - Sexdec 4 | N011 | 11 | 11 | 11 | 11 | 11 | 11 | 11 | 11 | 3 | 3 | 3 | 3 | 3 | 3 | 3 | 3 |
| 1100 | 4 - Sexdec 5 | N100 | 12 | 12 | 12 | 12 | 12 | 12 | 12 | 12 | 4 | 4 | 4 | 4 | 4 | 4 | 4 | 4 |
| 1101 | 4 - Sexdec 6 | N101 | 13 | 13 | 13 | 13 | 13 | 13 | 13 | 13 | 5 | 5 | 5 | 5 | 5 | 5 | 5 | 5 |
| 1110 | 4 - Sexdec 7 | N110 | 14 | 14 | 14 | 14 | 14 | 14 | 14 | 14 | 6 | 6 | 6 | 6 | 6 | 6 | 6 | 6 |
| 1111 | 4 - Sexdec Highest | N111 | 15 | 15 | 15 | 15 | 15 | 15 | 15 | 15 | 7 | 7 | 7 | 7 | 7 | 7 | 7 | 7 |

*FIG. 3*

MODULE STATUSES CORRESPONDING TO SLOT LOCATIONS

BACKGROUND

Electronic devices can use low-level concepts/signals regarding determining their location (e.g., relative to other devices), and determining which other devices are interconnected. Various approaches can be used to determine such information. Such approaches become more complex in a high-availability systems that place greater emphasis on reliability, fault-tolerance, and performance.

BRIEF DESCRIPTION OF THE DRAWINGS/FIGURES

FIG. 3 is a chart of slot assignments including an assignment rule according to an example.

DETAILED DESCRIPTION

Pins can be used in electronic devices to test for electrical contact, e.g., to allow a module to identify whether it is inserted in an enclosure. However, the value of such information increases, when shared with other modules that can take actions in view of the status of which other modules may or may not be inserted. Some systems used an N+1 matrix of ordered pin pairs to share presence status information. However, such approaches are limited because a given module would need to know its own relative location, before being able to determine which other modules were present. This resulted in the need for additional pins, as well as additional computation to be performed, before determining which other modules were present and how to access shared resources in a coordinated manner. Furthermore, such systems had reduced reliability. In an example, a master module included a location pin that was broken, such that it could not identify its own location. However, its remaining pins caused it to show up as present. This resulted in issues at other modules, which assumed the master would take control of the system due to its presence, but the master could not take control because its inability to locate itself prevented it from functioning as the master.

To address such issues, examples described herein allow for fault-tolerant high-availability environment sensing, to identify relative locations and states of associated equipment/systems. This improves mean time between failure by reducing components used, while also improving fault tolerance of the system to accommodate more component failures before needing an eventual scheduled replacement, thereby avoiding immediate replacement and customer outage. Example implementations can merge presence and mated information, enabling a user to enjoy additional troubleshooting options, e.g., identifying a module as being improperly/partially inserted (not mated fully and unable to communicate with other modules, despite being partially mated), without needing to assume the module is necessarily bad. Furthermore, example systems enjoy higher availability. It is possible for a given module, even if its location is unknown, to identify whether a partner/neighbor module is present, to coordinate resource usage appropriately.

Figure 1A:
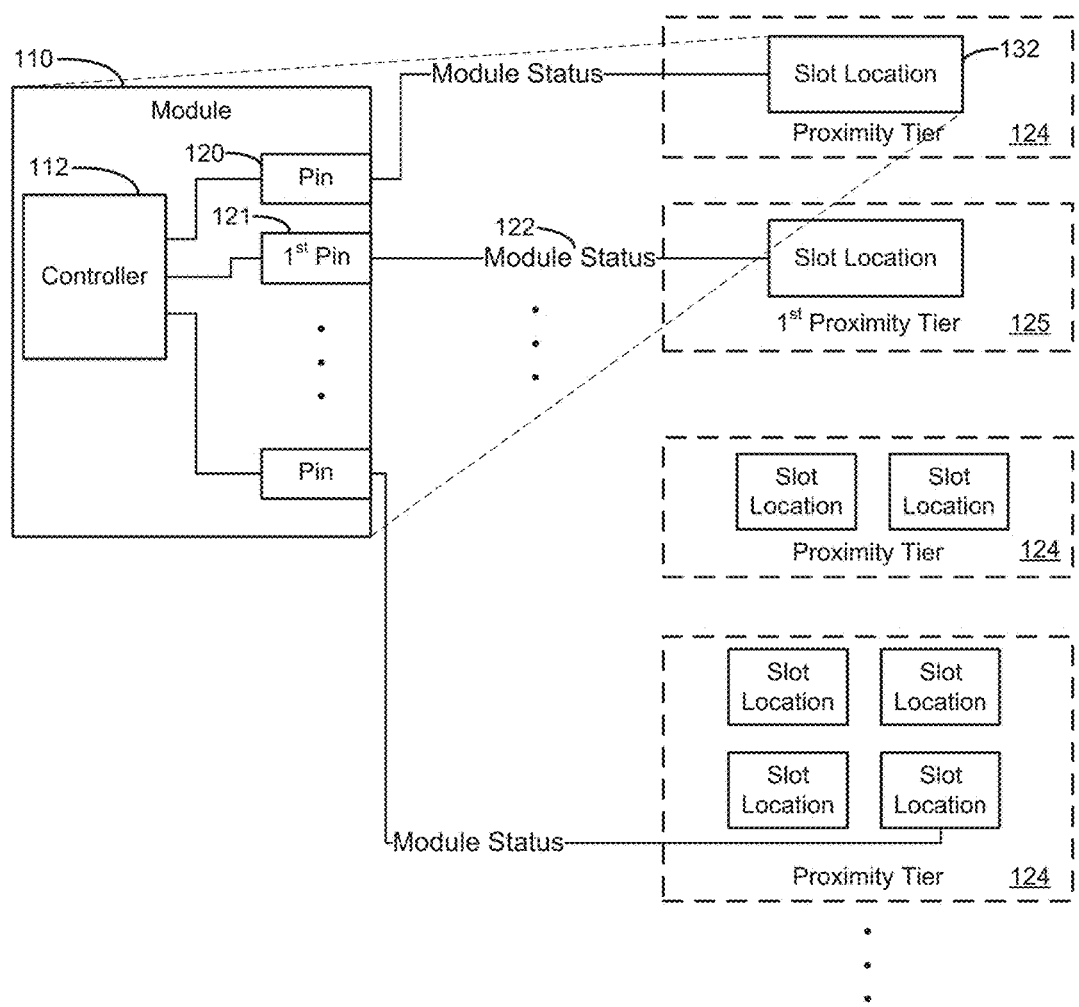
FIG. 1A is a block diagram of a module including a plurality of pins according to an example.

FIG. 1A is a block diagram of a module 110 including a plurality of pins 120 according to an example. The module 110 also includes a first pin 121, and a controller 112. The pins 120, 121 are to receive module statuses 122 from a plurality of slot locations 132. The plurality of slot locations 131 are arranged in proximity tiers 124, 125.

For any given module 110, a given pin is to receive the module status 122 for a given slot location 132 at varying proximity tiers relative to the module 110. The plurality of pins 120 are to receive the plurality of module statuses 122 from slot locations 132 such that each pin 120 is to receive the module status 122 of one slot location 132. A proximity tier corresponds to slot locations that share the same level of proximity to a given module. Accordingly, the module itself can be thought to occupy its own proximity tier 0, its nearest physical neighbor at proximity tier 1 (forming a pair of neighbors with the module), and the next nearest pair of neighbors at proximity tier 2. The modules at proximity tiers 0, 1, and 2 for a quad grouping of modules, which correspond to the next nearest pair of four at proximity tier 3. Generally, the number of modules (and corresponding slot locations) at a given proximity tier beyond the module's own proximity tier can be expressed as $2^{(n-1)}$, where n is the proximity tier level. As illustrated, the pin 0 120 is to receive module status for the slot location 132 corresponding to that module itself. Accordingly, controller 112 can check to the status of pin 0 120 to identify its own module status, as to whether it is inserted correctly. This ability to check pin 0 remains, regardless of in which slot location 132 the module is inserted. Similarly, the controller 112 can check on the module status 122 of its nearest neighbor, located at the first proximity tier 125, by checking the first pin 121 (i.e., pin 1). Even if the module 110 is inserted into a different location, the mapping between slot locations 132 and pins 120, 121 enable the controller 112 to check pin 1 (first pin 121) to determine the module status 122 of its nearest neighbor. Similarly, the controller 112 can check other pins to determine module statuses at increasingly distant proximity tiers. The approach for checking status at a given proximity relative to a given module remains unchanged, regardless of which slot location a module 110 is to occupy. Accordingly, the respective module statuses 122 received by the pins 120, 121 depend upon the slot location 132 occupied by the module 110 in the enclosure, to ensure that the proximity tiers 124, 125 relative to the module 110 remain consistent with the principles described herein.

Figure 1B:
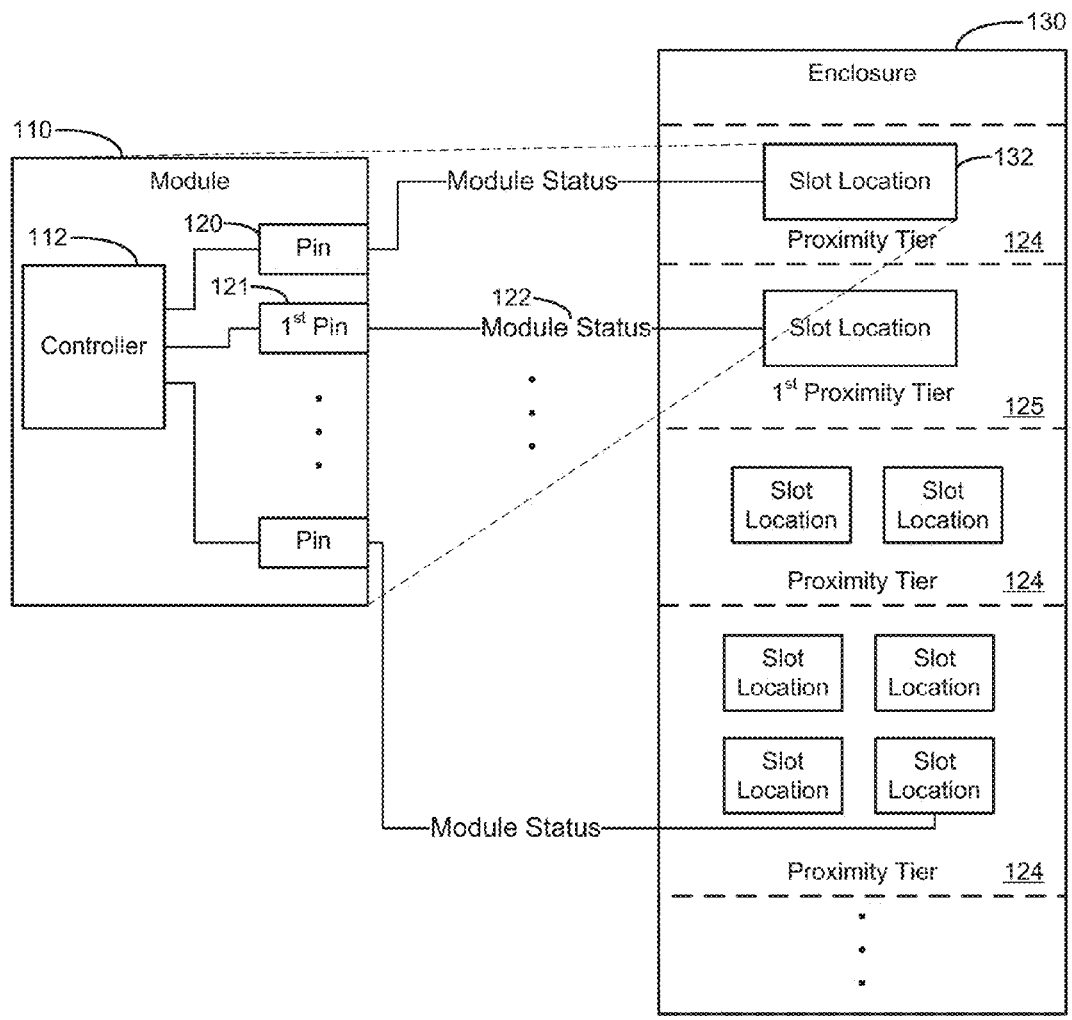
FIG. 1B is a block diagram of a module and an enclosure according to an example.

FIG. 1B is a block diagram of a module 110 including a plurality of pins 120 according to an example. The module 110 also includes a first pin 121, and a controller 112. The pins 120, 121 are to receive module statuses 122 from the enclosure 130. Although not specifically illustrated in FIG. 1, the enclosure 130 can include an enclosure controller to perform at least some of the functionality described herein. The enclosure 130 includes a plurality of slot locations 131 and proximity tiers 124, 125.

The enclosure 130 is represented as an abstraction to illustrate how slot locations 132 can be arranged according to their proximity relative to the given module 110. Accordingly, the module 110 is located in its own proximity tier 124, and the nearest neighbor slot location is located in the next nearest proximity (e.g., first proximity tier 125). The system of FIG. 1 is illustrated in the context of storage and enclosure management processing systems (e.g., a system using multiple server blades and/or storage nodes). The features described herein can be used in other applications such as modular electrical systems, control nodes in manufacturing lines, or other systems involving modules to be identified, detected as installed/not installed, whether partner/neighbor modules are present, and the like. In particular, the features described herein can benefit systems having a high need for reliability, and/or a high probability of abuse (e.g., dealing with unskilled labor) that might negatively affect contact pins.

A given module 110 can have a role that may depend on its location in the enclosure. For example, two modules 110 may have direct access to a hard drive in a given node, and need to coordinate/share access to avoid corrupting the hard drive. Multiple modules can share the same set of fans/power supplies/battery backups, and must coordinate over a communication bus without corrupting communications.

Fault-redundant systems can involve software at higher levels to perform load sharing and other tasks, which needs presence information for modules in the system. For example, the system needs to know the whether an issue is caused by a module 110 not being fully inserted, versus being fully inserted but not properly working. Examples described herein can identify insertion status efficiently, without needing to power up an entire system. A given system can generate significant heat when fully powered up, and it is therefore beneficial to coordinate fan usage and low level resource usage. If such resources cannot be ascertained until the system is fully powered up, there is increased risk for the system if a module is incorrectly located or identified as present (e.g., the lack of a module could create a physical hole in the system that negatively affects airflow/cooling, so such presence information is important for properly coordinating fan usage before the system reaches full power/heat).

In storage contexts, a given module shares access to various resources with its nearest-neighbor module. As illustrated in FIG. 1, the module 110 in the upper slot location 132 is to share resources with another module in the slot location at the first proximity tier 125. Accordingly, it is relatively more important for the module 110 to know the module status 122 for the slot location at the first proximity tier 125, and relatively less important to know the module status of slots located at proximity tiers of relatively lower proximity. Example implementations can still identify the module status 122 for other slot locations 132, even if location information for the module 110 is not known. Accordingly, arbitration of resources, or which module 110 of the enclosure 130 is to serve as master system, is not dependent on location pins. A controller 112, such as an enclosure management processing system controller or field-programmable gate array (FPGA), can determine which module is installed or not, based on the status of the pins and a set of rules, without a need for complex lookup tables or computations.

Generally, data bits received by the pins 20 of the module 110 are arranged such that one pin can be functional (e.g., first pin 121), but still enable the module 110 to obtain information about its partners (slot location at the first proximity tier 125) without needing multiple pins or lookup tables. Accordingly, example implementations simplify the layout and pin usage, while also making it straightforward for determining which module(s) are installed in the enclosure 130.

Two of the pins 120, such as the first and last pins, can be made physically shorter than other pins, such that they are the last to engage as the module 110 is inserted into a slot location 132. The shorter pins are physically separated from each other as far as plausible on the module pin interface. Accordingly, any skew in the module 110 results in greater difference in position between those two pins relative to each other. One of these shorter pins can be coupled to a weak pull up source, and the other to a strong pull down source. Accordingly, mating the module 110 with the enclosure 130 links these shorter pins to each other, such that the controller 112 can identify a logic 0 (e.g., pulled-down) value to indicate that the module 110 is fully mated/inserted. Similarly, a logic 1 indicates that the module 110 is not mated. This signal from the first module 110 is also routed to other modules in the enclosure 130, so that the other modules can also determine whether the first module 110 is present. Likewise, the first module 110 can determine whether a module is present in the slot location at the first proximity tier 125, to determine whether its own resource usage should be adjusted for coordinating with the partner module. This extends for other proximity tiers, depending on which resource is to be coordinated. Lower tiers can be associated with lower-priority resources to be shared, such that resource coordination is prioritized from the first proximity tier 125 down.

The bits to indicate module status 122 are routed throughout the enclosure 130, and received by each module 110, such that status of a given module's nearest neighbor (e.g., highest priority proximity tier) is indicated on the same pin (e.g., first pin 121), regardless of in which slot the module is inserted. This enables low-level firmware (e.g., without needing full system processing) to know about a partner module that shares resources, such as power, cooling, and communication busses, before an entire matrix of N+1 systems are up. Pins 120 and the associated module statuses 122 received at the pins 120 are arranged by powers of two, such that relative proximity location grouping increases with each additional power of two (e.g., one slot location at the first proximity tier 125, two slot locations at the next proximity tier, four slot locations at the next, and so on), and the actual hard details such as physical slot number can be determined using a straightforward formula without need of a lookup table.

Figure 2:
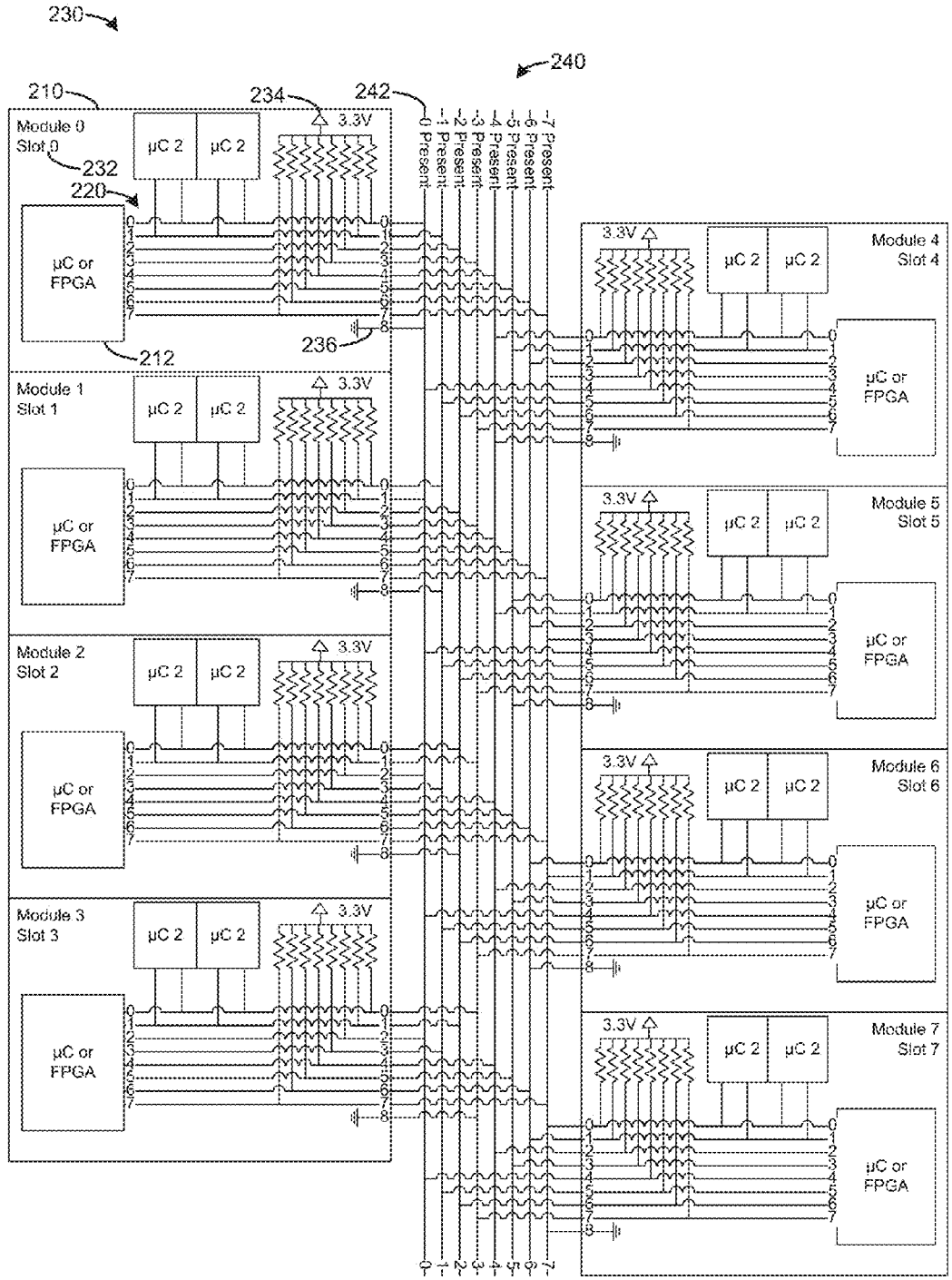
FIG. 2 is a block diagram of an enclosure including a plurality of modules according to an example.

FIG. 2 is a block diagram of an enclosure 230 including a plurality of modules 210 according to an example. The enclosure 230 also includes a plurality of slot locations 232 to receive the modules 210, and a backplane 240 including a plurality of traces/lines 242. A module includes a plurality of controllers 212, coupled to a plurality of pins 220. The pins 220 are coupled to pull-up source 234 and/or pull-down source 236. Example lines/traces are shown connected for an example eight-module design, although the connections can be adjusted for a greater or fewer number of modules, following the assignment principles described herein for connecting the pins/traces/lines.

Generally, the illustrated enclosure 230 includes eight modules 210, and in alternate example implementations, an enclosure may include a greater or fewer number of modules 210. While shown as a single enclosure 230, the modules can be arranged in four smaller enclosures that each contained two modules (e.g., paired as modules 0 and 1, 2 and 3, 4 and 5, and 6 and 7) that are cooled and powered independently of the other pairs of modules.

The controller 212 can be a microcontroller, FPGA, or other approach for interpreting signals on the pins 220 to determine whether a given module 210 is inserted in the enclosure 230. By default, pins 210 for un-inserted modules will be logic 1, and when inserted, the pins are pulled down to ground/logic 0.

The illustrated microcontrollers, labeled as µC 2, can provide additional functionality for a module 210, such as by operating independent functionality/firmware. The FPGA controller 212 can run code and report to higher levels of software, which can perform data clustering by using the knowledge of module statuses as provided by the pins 220. In contrast, the microcontrollers µC 2 can independently turn on/off the power and/or fans, check temperatures, provide indications of problems, and the like, without a need to analyze the status of other, lower priority modules that are not its partner and therefore do not share such power/fan resources. Thus, the controller 212 can interpret the pins 220 to identify module statuses for other modules in the enclosure 230.

The pins 220 are shown with nine total (the first eight pins 0-7, for data, and the ninth pin 8 for reference/ground), but implementations are not so limited, and can implement fewer or greater numbers of pins (e.g., four pins in a four-module enclosure). The pins 220 are labeled with given pin numbers for convenience, and a module or enclosure may include hundreds of pins, of which the illustrated designated pins are used for providing the features as described herein. As illustrated and labeled, the eight pins 0-7 for a given module 210 are ordered such that the higher up in pin number corresponds to receiving module status signals from modules located correspondingly farther away physically from the given module 210. Thus, the module signals as received from the backplane 240 lines 242 are not consistently being mapped in the same numerical order to the pins of each module 210. For example, consider module 1, whose pin 0 is mapped to line 1 present, and whose pin 1 is mapped to line 0 present, with pins 2-7 being mapped to lines 2-7. Such variation, which differs for each module, in numerical order enables each module to avoid the additional limitation of the given module also needing to know where it is located in the enclosure. In contrast, the example implementations described herein have pins ordered to provide module status that is inherently meaningful in terms of what proximity the module status represents for a given pin. Accordingly, pin 0 of a given module provides module status for itself. Pin 1 of the given module provides module status for its nearest neighbor module, at proximity tier 1. Pin 2 corresponds to the module nearest to the neighbor module, pin 3 is next nearest module, and so on with additional pins providing the module statuses for correspondingly farther away modules relative to that given module. The proximity tier information is meaningful to a given module, because it allows a controller to identify how much of an impact the module may have, in terms of coordinating shared resources. More specifically, a nearest neighbor is likely to share important resources with the given module, such as power, and the module is likely to adjust its operating strategy and access to shared resources depending on whether its nearest neighbor is present or not. In contrast, a module will be likely to incur less of an impact if a far module (e.g., at proximity tier 10) is present or absent. In an example implementation, blade servers can be inserted in an enclosure, and the first four blades can share the same backplane switch. Thus, the module status for the first four blades sharing the switch resource is more important for those blades to know for coordinating switching, compared to the next four blades that use their own switch and do not share the backplane switch of the first four blades.

As illustrated, pin 0 and pin 8 of each module is coupled to provide module status for that module, representing pins located at furthest distance from each other and thereby most affected by any skew or misalignment in the module. Although not specifically illustrated in FIG. 2, diodes also can be used on the pins to ensure that a given pin functions as a pull-down resistor during unplanned circumstances, such as during a power failure, to block the wrong information from being inadvertently sent from one module to the backplane.

The arrangement of information on the pins 220 is prioritized such that as little as one pin enables the module status system to remain functional, by enabling a given module to check the status of its nearest neighbor, regardless of whether the module knows its own location or otherwise needing to decode a combination of pins data. Thus, module 0 at slot 0 can check whether its partner module is present, by merely checking a single pin, its own pin 1. That status check enables the module 0 to know whether it needs to share power or other resources, because pin 1 corresponds to its neighbor (module 1) with which it is to share power. Similarly, module 1 in slot 1 can check the status of its nearest neighbor (module 0) by checking its pin 1. Any given module can check on its neighbor's status by checking its own pin 1, regardless of in which slot the module is located, or whether the module even knows in which slot it is located. This provides enhanced fault tolerance, because if other pins are damaged, the module can still check the status of its neighbor (or other modules as needed). There is no need to also check its own location in order to know which pin would be its neighbor, and no need to also check a lookup table to see which pins may be its neighbor.

The pull-up source 234 and the pull-down source 236 are used to enable fault tolerant voltage values corresponding to logic 1 and logic 0, used by modules to know whether a module status indicates presence or non-presence. The illustrated approach (weak pull-up by default, which is selectively pulled down by the strong pull-down to indicate presence) provides different results for when a module is not present versus a module being shorted out/not working/bad. Providing this difference is meaningful because a module being present but not working can still maintain proper airflow in terms of shared fan resources, in contrast to a not present module that leaves a hole in the server that disrupts airflow and affects how remaining modules are to use the fan shared resource. In an example system, a 10 Kilo Ohm resistor and 3.3 Volt source can be used for the pull-up source, and the pull-down source can use a direct ground connection (e.g., a very low resistance or even zero resistance to ground). In alternate examples (e.g., an enclosure having 4 slots/modules), other resistance values can be used for the pull-up source, e.g., using a 4.7 K resistor. Because the ground pin is sinking current from multiple modules, as increasing numbers of modules are used, increasing values of resistance can be used on the pull-up source. For example, in a 16-pin arrangement corresponding to a 16-module enclosure, 14K resistors can be used between the pins and the voltage source, to avoid excessive power waste.

FIG. 3 is a chart 300 of slot assignments 332 including an assignment rule 302 according to an example. The chart 300 also includes pin numbers 320, the corresponding binary pin numbers 310, proximity hierarchy tier 324, and the slot assignments.

The chart 300 is shaded to indicate rows of a given proximity hierarchy tier 324. Each transition between tiers is represented by the addition of another binary digit at the pin numbers 320, corresponding to an increase in a power of two. Thus, pin 0 corresponds to its own/self tier 0, pin 1 corresponds to the next tier 1 (as indicated by a change in shading in the chart 300), pins 2 and 3 correspond to the next tier 2, and so on. Generally, a given tier n (beyond the pin 0 self tier), includes $2^{(n-1)}$ total number of pins, numbered from $(2^n-1)$ to $2^{(n-1)}$. The tier 1 completes a pair, including the earlier tier 0 self. Tier 2 completes a quad, including the earlier pair. Similarly, tier 3 completes a set of 8, and tier 4 completes a set of 16.

For a given module, that module can check its own module status by checking its own pin 0 (tier 0). The status of the nearest neighbor for that module is on pin 1 (tier 1), and pins 2 and 3 provide the status for the next nearest neighbor (tier 2), then pins 4-7 would be the next cluster of four (tier 3), pins 8-15 would be the next cluster of 8 (tier 4), and so on. Accordingly, pins for any given module provide a logical arrangement of module status relevant to physical proximity to that given module. Thus, there is no need for a lookup table, and accordingly no need to update that lookup table by updating the firmware every time the arrangement of modules is changed). The example approaches described herein can expand as more nodes and functionality are added, without needing to change how module statuses are mapped between modules. Any given module can determine module status information simply, using a rule, without need for a lookup table or customized configurations for different module arrangement. Thus, no need for different information/firmware programming between modules. A module can check the presence of its neighbor without needing to know its own location in an enclosure.

The proximity hierarchy tiers 324 can represent different types of resources that are shared among modules. The first tier 1 can correspond to resources such as hard drives, power, fans, and battery backup shared between a given module (at tier 0) and its nearest neighbor/partner (at tier 1). The first four modules, corresponding to pins 0, 1, 2, and 3 (at tiers 0, 1, and 2), are a quad that share the same power, e.g., AC power on battery backup, a module that converts AC power to DC power and a battery to power the system for a time. The first eight modules, corresponding to pins 0, 1, 2, 3, 4, 5, 6, 7 (at tiers 0, 1, 2, and 3) share the same box in a rack. The next eight modules are in the same rack but not in the same box. Accordingly, if a box needs to be moved or taken down, tiers 0, 1, 2, and 3 can be impacted. If the box is powering up, the modules in the box can be powered up in sequence to avoid brownouts or other issues, by coordinating resource usage from detecting the status of those modules at those tiers. In an example, tiers can represent whether there is shared access to resources such as a given rack, a given circuit breaker, a given air conditioning unit, and so on.

The assignment rule 302 illustrates how to determine, for a given pin of a given module, which other module's status will be received at that given pin. The assignment rule 302 uses symbols that represent how each bit is treated. In FIG. 3, the assignment rule 302 is given for a total of four bits, but can be expanded or contracted to accommodate greater or fewer number of bits.

The presence of an X in the assignment rule 302 indicates a bit digit that should be copied from the binary representation of the given module/slot location whose pins are being assigned. Thus, for the column S 0 (slot 0), the binary value for that module/slot is 0000, which corresponds to each X in the assignment rule for pin 1. Accordingly, the row for pin 0 at column S 0 is 0000 (shown in decimal in FIG. 3 as 0).

The presence of an N in the assignment rule 302 indicates that the value of the corresponding bit is to be negated/ toggled. Considering the second row corresponding to pin 1, the rule is to copy the first three bit digits from the given slot number (which is S 0 for this example), and negate the fourth bit digit. For the column S 0, the binary value for that module/slot is 0000, so the corresponding assignment is 0001 (where the 1 is obtained by negating the last bit) for pin 1 of slot/module 0, such that the pin would receive the module status for slot/module 0001 in the enclosure. This is shown in chart 300 at the row for pin 1 of the column S 0, which has the value 1 (decimal for the binary value 0001).

The presence of a value (0 or 1) in the assignment rule 302 indicates that the value of the corresponding bit is to be assigned. Considering the third row corresponding to pin 2, the rule is to copy the first two bit digits from the given module/slot number (which is S 0 for this example), negate the third bit digit, and assign the fourth bit digit a value of 0. For the column S 0, the binary value for that module/slot is 0000, so the corresponding assignment is 0010 (where the 1 is obtained by negating the third bit) for pin 2 of slot/module 0, such that the pin would receive the module status for slot/module 0002 in the enclosure. This is shown in chart 300 at the row for pin 2 of the column S 0, which has the value 2 (decimal for the binary value 0010).

The assignment rule 302 can be used to determine which other module's status is received at a given pin. The assignment rule 302 can be implemented as a mask that is based on the given module/slot number.

Figure 4:
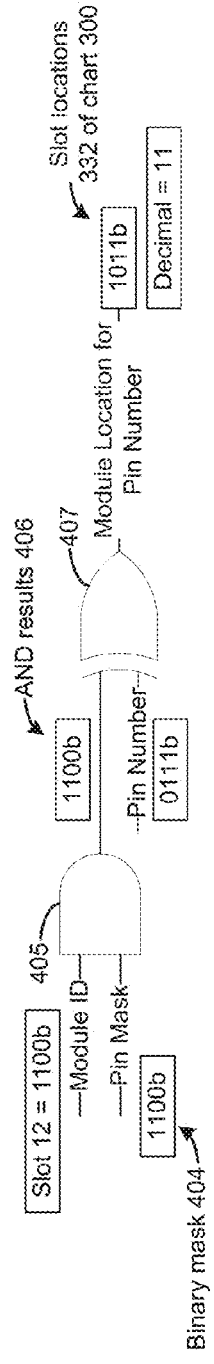
FIG. 4A is a logic diagram to apply an assignment rule according to an example.
FIG. 4B is a chart including a binary mask, and AND results obtained by applying the binary mask, according to an example.

FIG. 4A is a logic diagram 400A to apply an assignment rule according to an example. The logic diagram 400A illustrates an example approach for applying the assignment rule 302 set forth above with reference to FIG. 3, to obtain as output the slot locations 332 illustrated in FIG. 3. An AND logic gate 405 is to receive, as input, i) a module ID/slot ID for the module/slot whose pin is to be interpreted/ assigned, and ii) the value of the bit mask corresponding to that module/slot number, obtained from the corresponding row of the binary mask 404. An exclusive OR (XOR) logic gate 407 is to receive, as input, i) the output from the AND logic gate 405 (corresponding to the AND results 406), and ii) the pin number to be interpreted/assigned. The XOR logic gate 407 is to provide, as output, the module/slot location whose status is to be assigned to that pin number.

The logic diagram 400A relies on fundamental logic gates, which can be provided by a controller. In an example, logic gates are available on an FPGA chip such that once programmed, the FPGA chip can implement the assignment rule without impacting compute time or imposing memory cost for calculations. The assignment rule can be applied efficiently and quickly, without a need for a lookup table.

The logic diagram 400A is shown performing an example determination for identifying which module/slot status corresponds to pin 7 ("pin number") of slot/module 12 (Module/Slot ID). The result, shown in FIG. 3 at the column S 12 (for slot/module 12) and row 111/7 (for pin 7), is 0011. To arrive at this result, the module/slot ID of 12=1100 binary is fed as the first input into the AND logic gate 405, and the pin mask of 1100 binary is fed as the second input into the AND logic gate 405. The pin mask value 1100 was obtained by referencing the mask 404, at row 7, containing the mask 1100. The AND result of (1100 AND 1100) is 1100, which is fed as the first input to the XOR logic gate 407. The pin number 7 (0111 binary) at issue is fed as the second input to the XOR logic gate 407. The result of (1100 XOR 0111) is 1011 binary, corresponding to 11 decimal. Accordingly, the logic diagram 400A has determined that for slot/module 12, the $7^{th}$ pin will correspond to module/slot status for module/ slot 7. In this manner, any value for slot locations 332 of chart 300 can be determined efficiently.

FIG. 4B is a chart 400B including a binary mask 404, and AND results 406. The AND results 406 are obtained by applying the binary mask 404 to a physical module number and a given pin. The AND results 406 are then used to obtain the assignments (columns S 0 through S 15 of chart 300 shown in FIG. 3).

The physical module number (module/slot number), whose pin is to be assigned a module status, is used as input. A math "AND" operation is performed between the module/slot number and the values in the pin mask 404. The results from the AND operation, shown as the AND results 406, are then used to perform a math operation Exclusive OR ("XOR") with the pin number, i.e., the result from use of the binary mask 404 is then used by the AND results 406 to perform the XOR operation between the result from the binary mask 404 and the contents of the AND results 406. The final results of the XOR operation produce the values at columns S 0-S 15 of chart 300 of FIG. 3.

Figure 5:
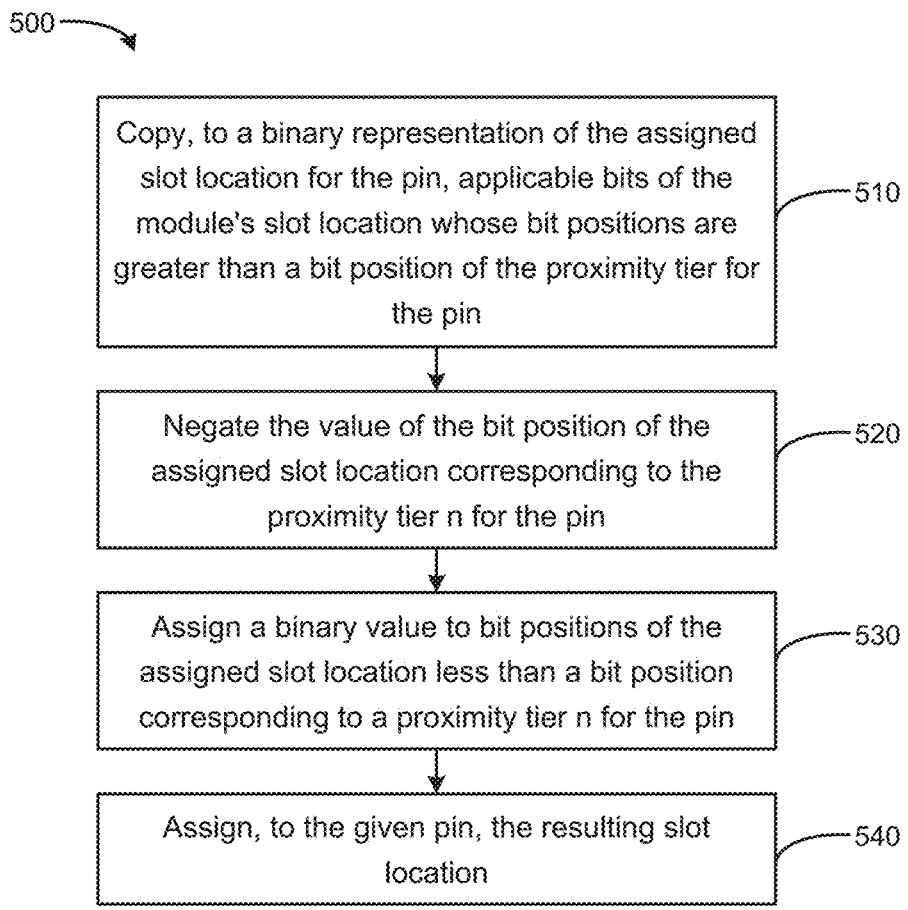
FIG. 5 is a flow chart based on assigning slot locations to pins according to an example.

Referring to FIG. 5, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 500 based on identifying which module/slot locations are sending their module status to which pins of a given module, according to an example. In block 510, applicable bits of the module's slot location whose bit positions are greater than a bit position of the proximity tier for the pin are copied to a binary representation of the assigned slot location for the pin. For example, an assignment rule indicates bit positions X that are to be copied. The bit positions X in the assignment rule are located to the left of the bit position N, corresponding to the proximity tier for that pin. In block 520, the value of the bit position of the assigned slot location corresponding to the proximity tier N for the pin is negated. For example, the assignment rule indicates that bit positions N are to be negated. In block 530, a binary value is assigned to bit positions of the assigned slot location less than a bit position corresponding to a proximity tier n for the pin. For example, the assignment rule indicates that bit positions to the right of the N are manually assigned (based on an incrementing decimal value that fills the digits to the right of the N). In block 540, the resulting slot/module location is assigned to the given pin. For example, a module can check a given one of its pins, and will receive a module status on that pin corresponding to the resulting slot location as determined by the assignment rule for that module/pin.

What is claimed is:

1. A module for use in an enclosure, comprising:
a controller; and
a plurality of pins coupled to the controller to receive a plurality of module statuses, respectively, corresponding to slot locations of the enclosure at various proximity tiers relative to the module;
wherein the controller is to check a first pin of the plurality of pins to identify whether a first proximity tier relative to the module is occupied, regardless of a slot location of the module in the enclosure.

2. The module of claim 1, wherein the plurality of pins of the module are to receive the plurality of respective module statuses as a function of the slot location of the module, such that the plurality of pins are to receive different respective module statuses based on which slot location of the enclosure the module is to occupy.

3. The module of claim 1, wherein the plurality of pins of the module are to indicate module statuses of a corresponding plurality of modules according to a hierarchy of proximity tiers, wherein the hierarchy of proximity tiers, relative to a given slot location of the module, remains unchanged regardless of which slot location the module is to occupy.

4. The module of claim 3, wherein a given proximity tier includes a number of slot locations falling within a corresponding binary value of slot location(s), such that a given proximity tier n includes $2^{(n-1)}$ slot location(s) relative to the module.

5. The module of claim 3, wherein the hierarchy of proximity tiers corresponds to a hierarchy of resource sharing dependency between modules occupying those corresponding slot locations.

6. The module of claim 1, wherein a given pin of a given module is to receive a presence status of an assigned slot location for that pin, as determined by representing the given module's slot location in binary, and:
copying, to a binary representation of the assigned slot location for the pin, applicable bits of the module's slot location whose bit positions are greater than a bit position of the proximity tier for the pin;
negating the value of the bit position of the assigned slot location corresponding to a proximity tier n for the pin;
assigning a binary value to bit positions of the assigned slot location less than a bit position corresponding to the proximity tier n for the pin; and
assigning, to the given pin, the resulting slot location.

7. The module of claim 6, wherein the binary value, assigned to at least a portion of the bit positions of the assigned slot location, is zero at the pin corresponding to the beginning of a proximity tier, and increments by one for subsequent pins within the proximity tier.

8. The module of claim 1, wherein physically shorter pins, among the plurality of pins, are used for indicating whether the module is mated fully.

9. The module of claim 8, wherein the physically shorter pins are located physically the most distant from each other at the module, to increase an effect, caused by physical skew of the module relative to the enclosure, on the module pins being mated with enclosure pins.

10. The module of claim 1, wherein for a total number of pins p, pins 1 through (p-1) are coupled to a weak pull-up source, and pin p is coupled to a strong pull-down source.

11. An enclosure comprising:
a plurality of slots to receive a respective plurality of modules, wherein a given slot includes a plurality of pins routed to provide module statuses corresponding to slot locations of the enclosure at various proximity tiers relative to the given slot; and
a backplane including a plurality of lines to couple the pins of the plurality of slots to each other, wherein a first pin of a given slot is coupled to a respective line of the backplane corresponding to a position of that given slot in the enclosure.

12. The enclosure of claim 11, wherein a last pin of a given slot is tied to ground to serve as a strong pull down source, and the last pin of the given slot is tied to the respective line of the backplane corresponding to a position of that given slot in the enclosure.

13. The enclosure of claim 11, wherein the various proximity tiers are based on a hierarchy of proximity tiers corresponding to a hierarchy of resource sharing dependency, wherein a first resource hierarchy corresponds to sharing at least one of: i) storage devices, ii) primary power, iii) fans, and iv) backup power; wherein a second resource hierarchy corresponds to sharing at least one of: i) primary power, and ii) backup power; wherein a third resource hierarchy corresponds to sharing a physical box in a physical rack; and wherein a fourth resource hierarchy corresponds to sharing a physical rack.

14. A method comprising:
    determining, by a removable module of a computer system, a slot location associated with a pin of the module, wherein determining the slot location comprises:
        copying, to a binary representation of an assigned slot location for the pin, applicable bits of a slot location for the module whose bit positions are greater than a bit position of a proximity tier for the pin;
        negating the value of the bit position of the assigned slot location corresponding to the proximity tier n for the pin; and
        assigning a binary value to bit positions of the assigned slot location less than a bit position corresponding to a proximity tier n for the pin;
    assigning, to the pin, the determined slot location;
    receiving a module status via the pin; and
    taking action in the computer system based on the received module status and the slot location assigned to the pin.

15. The method of claim 14, wherein the module status received via the pin comprises a module status of a nearest neighbor to the module.

16. The method of claim 14, wherein the module status comprises an indication of the presence of another module associated with the slot location assigned to the pin, and taking action in the computer system comprises sharing resources of the computer system based on the received module status.

17. The method of claim 14, wherein the received module status indicates the presence of another module associated with the slot location assigned to the pin, and taking action in the computer system comprises controlling thermal management in the computer system based on the received module status.

* * * * *